(12) United States Patent
King et al.

(10) Patent No.: US 9,030,536 B2
(45) Date of Patent: May 12, 2015

(54) APPARATUS AND METHOD FOR PRESENTING MEDIA CONTENT

(75) Inventors: Robert King, Roswell, GA (US); Sharon Carter, Austell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1115 days.

(21) Appl. No.: 12/794,657

(22) Filed: Jun. 4, 2010

(65) Prior Publication Data

US 2011/0298803 A1 Dec. 8, 2011

(51) Int. Cl.
*H04N 13/04* (2006.01)

(52) U.S. Cl.
CPC ....... *H04N 13/0454* (2013.01); *H04N 13/0484* (2013.01); *H04N 13/0429* (2013.01)

(58) Field of Classification Search
None
See application file for complete search history.

(56) References Cited

U.S. PATENT DOCUMENTS

| | | | |
|---|---|---|---|
| 2,832,821 A | 4/1958 | Du Mont | |
| 4,649,425 A | 3/1987 | Pund | |
| 5,012,351 A | 4/1991 | Isono | |
| 5,293,529 A | 3/1994 | Yoshimura et al. | |
| 5,465,175 A | 11/1995 | Woodgate | |
| 6,014,164 A | 1/2000 | Woodgate | |
| 6,115,177 A | 9/2000 | Vossler | |
| 6,144,375 A | 11/2000 | Jain et al. | |
| 6,188,442 B1 | 2/2001 | Narayanaswami | |
| 6,243,054 B1 | 6/2001 | DeLuca | |
| 6,285,368 B1 | 9/2001 | Sudo | |
| 6,535,241 B1 | 3/2003 | McDowall | |
| 6,559,813 B1 | 5/2003 | DeLuca | |
| 6,654,721 B2 | 11/2003 | Handelman | |
| 6,725,463 B1 | 4/2004 | Birleson | |
| 6,859,549 B1 | 2/2005 | Oliensis | |
| 6,924,833 B1 | 8/2005 | McDowall | |
| 6,965,381 B2 | 11/2005 | Kitamura | |
| 7,106,358 B2 | 9/2006 | Valliath et al. | |
| 7,204,592 B2 | 4/2007 | O'Donnell | |
| 7,391,443 B2 | 6/2008 | Kojima et al. | |
| 7,613,927 B2 | 11/2009 | Holovacs | |
| 7,785,201 B2 | 8/2010 | Hashimoto | |
| 7,813,543 B2 | 10/2010 | Modén | |
| 8,111,282 B2 | 2/2012 | Cutler et al. | |
| 8,117,281 B2 | 2/2012 | Robinson et al. | |
| 8,254,668 B2 | 8/2012 | Mashitani | |
| 8,305,914 B2 | 11/2012 | Thielman et al. | |

(Continued)

OTHER PUBLICATIONS

Edwards, "Active Shutter 3D Technology for HDTV", PhysOrg.com; 12 pages; Sep. 25, 2009; http://www.physorg.com/news173082582.html; web site last visited May 10, 2010.

*Primary Examiner* — Christopher S Kelley
*Assistant Examiner* — Christopher Findley
(74) *Attorney, Agent, or Firm* — Guntin & Gust, PLC; Ralph Trementozzi

(57) ABSTRACT

A system that incorporates teachings of the present disclosure may include, for example, a media processor including a controller to receive a broadcast of media content comprising three-dimensional image content for presentation on a display device operably coupled with the media processor, adjust the broadcast of the media content to comprise two-dimensional image content, and present the media content on a display device, wherein the controller adjusts the media content to comprise the two-dimensional image content during presentation of the broadcast of the media content on the display device. Other embodiments are disclosed.

20 Claims, 7 Drawing Sheets

(56) References Cited

U.S. PATENT DOCUMENTS

| | | |
|---|---|---|
| 8,370,873 B2* | 2/2013 | Shintani .......... 725/39 |
| 8,416,278 B2 | 4/2013 | Kim et al. |
| 8,456,507 B1 | 6/2013 | Mallappa et al. |
| 8,552,983 B2 | 10/2013 | Chiu |
| 8,675,067 B2 | 3/2014 | Chou et al. |
| 2002/0009137 A1 | 1/2002 | Nelson |
| 2002/0122145 A1 | 9/2002 | Tung |
| 2002/0122585 A1 | 9/2002 | Swift et al. |
| 2003/0043262 A1 | 3/2003 | Takemoto |
| 2003/0128273 A1 | 7/2003 | Matsui |
| 2003/0132951 A1 | 7/2003 | Sorokin et al. |
| 2003/0214630 A1 | 11/2003 | Winterbotham |
| 2003/0223499 A1 | 12/2003 | Routhier |
| 2003/0231179 A1 | 12/2003 | Suzuki |
| 2004/0027452 A1 | 2/2004 | Yun |
| 2004/0104864 A1 | 6/2004 | Nakada |
| 2004/0109093 A1 | 6/2004 | Small-Stryker |
| 2004/0218104 A1 | 11/2004 | Smith |
| 2005/0041736 A1 | 2/2005 | Butler-Smith et al. |
| 2005/0084006 A1 | 4/2005 | Lei |
| 2005/0123171 A1 | 6/2005 | Kobayashi et al. |
| 2005/0169553 A1 | 8/2005 | Maurer |
| 2005/0185711 A1 | 8/2005 | Pfister |
| 2005/0190180 A1 | 9/2005 | Jin et al. |
| 2005/0270367 A1 | 12/2005 | McDowall |
| 2006/0046846 A1 | 3/2006 | Hashimoto |
| 2006/0109200 A1 | 5/2006 | Alden |
| 2006/0161410 A1 | 7/2006 | Hamatani et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0153122 A1 | 7/2007 | Ayite |
| 2007/0171275 A1 | 7/2007 | Kenoyer |
| 2007/0242068 A1 | 10/2007 | Han |
| 2007/0263003 A1 | 11/2007 | Ko |
| 2007/0266412 A1 | 11/2007 | Trowbridge |
| 2007/0296721 A1 | 12/2007 | Chang et al. |
| 2008/0024454 A1 | 1/2008 | Everest |
| 2008/0044079 A1 | 2/2008 | Chao et al. |
| 2008/0062125 A1 | 3/2008 | Kitaura |
| 2008/0080852 A1 | 4/2008 | Chen |
| 2008/0100547 A1 | 5/2008 | Cernasov |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1 | 10/2008 | Chen |
| 2008/0303896 A1 | 12/2008 | Lipton |
| 2008/0310499 A1 | 12/2008 | Kim |
| 2009/0100474 A1 | 4/2009 | Migos |
| 2009/0122134 A1 | 5/2009 | Joung et al. |
| 2009/0128620 A1 | 5/2009 | Lipton |
| 2009/0160934 A1 | 6/2009 | Hendrickson et al. |
| 2009/0174708 A1 | 7/2009 | Yoda et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2010/0007582 A1 | 1/2010 | Zalewski |
| 2010/0013738 A1 | 1/2010 | Covannon |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085424 A1* | 4/2010 | Kane et al. .......... 348/53 |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0134411 A1 | 6/2010 | Tsumura |
| 2010/0150523 A1 | 6/2010 | Okubo |
| 2010/0171697 A1 | 7/2010 | Son et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0303442 A1 | 12/2010 | Newton et al. |
| 2010/0306800 A1 | 12/2010 | Jung et al. |
| 2010/0309287 A1 | 12/2010 | Rodriguez |
| 2011/0001806 A1 | 1/2011 | Nakahata |
| 2011/0012896 A1 | 1/2011 | Ji |
| 2011/0012992 A1 | 1/2011 | Luthra |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164122 A1 | 7/2011 | Hardacker |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267437 A1 | 11/2011 | Abeloe |
| 2011/0267439 A1 | 11/2011 | Chen |
| 2011/0271304 A1 | 11/2011 | Loretan |
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050507 A1 | 3/2012 | Keys |
| 2012/0092445 A1 | 4/2012 | McDowell et al. |
| 2012/0169730 A1 | 7/2012 | Inoue |
| 2012/0169838 A1 | 7/2012 | Sekine |
| 2012/0249719 A1 | 10/2012 | Lemmey et al. |
| 2012/0274731 A1 | 11/2012 | Shanmukhadas et al. |

\* cited by examiner

400

RF and/or Light

500

600

800

APPARATUS AND METHOD FOR PRESENTING MEDIA CONTENT

FIELD OF THE DISCLOSURE

The present disclosure relates generally to media content communication and more specifically to an apparatus and method for presenting media content.

BACKGROUND

Media consumption has become a multibillion dollar industry that continues to grow rapidly. High resolution displays such as high definition television and high resolution computer monitors can now present two-dimensional movies and games with three-dimensional perspective with clarity never seen before. Collectively, improvements in viewing, audio, and communication technologies are causing rapid demand for consumption of all types of media content.

However, viewers have differing preferences as to types of media content and often desire the flexibility of choice among the various media types.

DETAILED DESCRIPTION

One embodiment of the present disclosure can entail a media processor comprising a controller to receive a broadcast of media content comprising three-dimensional image content for presentation on a display device operably coupled with the media processor, adjust the broadcast of the media content to comprise two-dimensional image content, and present the media content on a display device, wherein the controller adjusts the media content to comprise the two-dimensional image content during presentation of the broadcast of the media content on the display device, wherein the three-dimensional image content comprises left and right image pairs, and wherein the controller adjusts the media content to comprise the two-dimensional image content by replacing one of the left or right image pairs with the other of the left or right image pairs.

One embodiment of the present disclosure can entail a computer-readable storage medium operating in one of a gaming console, a set top box or a television, comprising computer instructions to receive a broadcast of media content comprising three-dimensional image content for presentation on a display device operably coupled with one of the gaming console, the set top box or the television, and adjust the broadcast of the media content to comprise two-dimensional image content during presentation of the broadcast of the media content on the display device, wherein the three-dimensional image content comprises left and right image pairs, and comprising computer instructions to adjust the media content to comprise the two-dimensional image content by replacing one of the left or right image pairs with the other of the left or right image pairs.

One embodiment of the present disclosure can entail a method comprising receiving media content at a media processor, the media content comprising three-dimensional image content for presentation on a display device operably coupled to the media processor, adjusting in real time the received media content to comprise two-dimensional image content, and presenting the media content on the display device.

Figure 1:
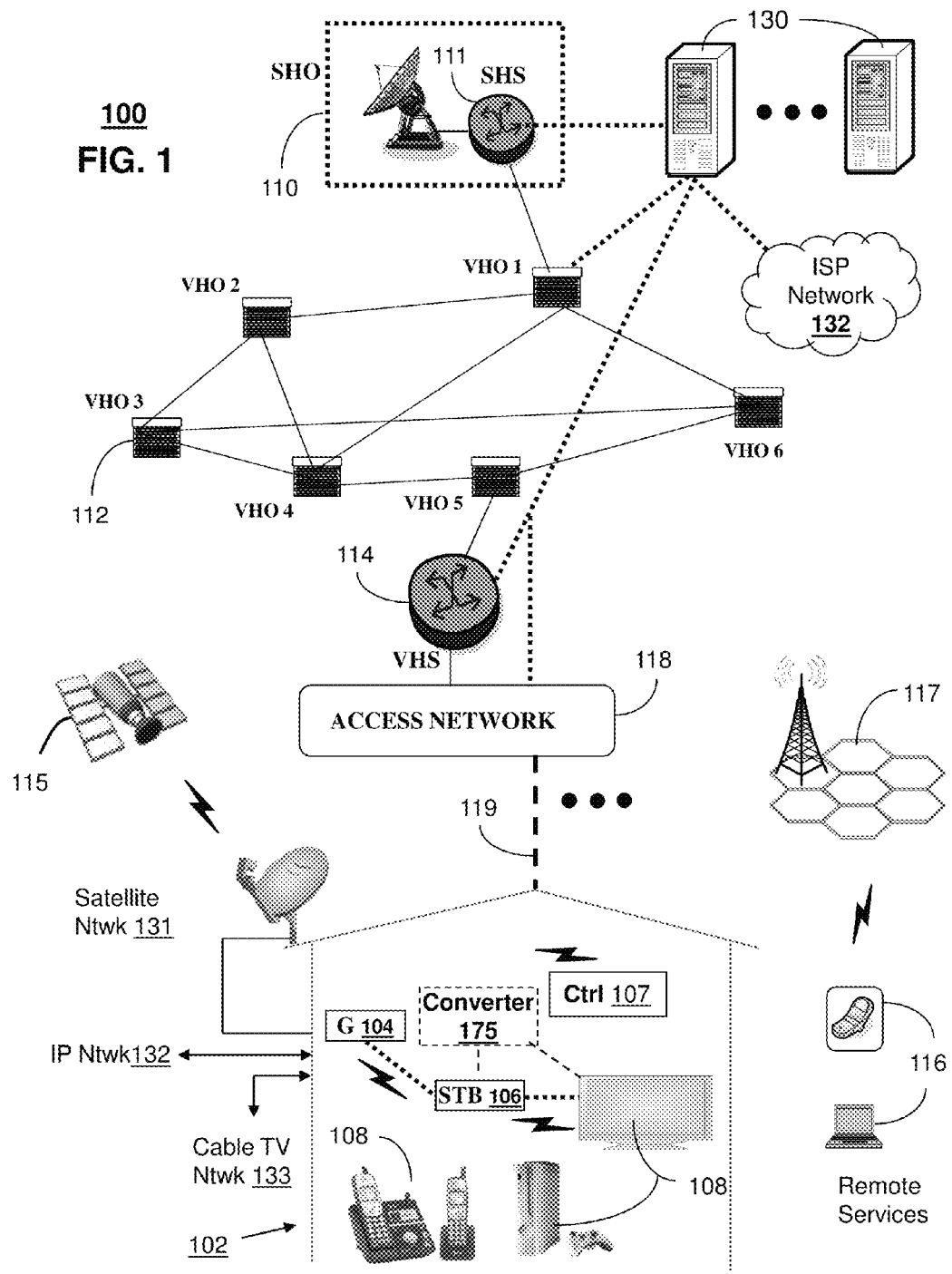
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) or gaming consoles (e.g., PS3, Xbox or Wii) which in turn present broadcast channels to media devices 108 such as computers, television sets, managed in some instances by a media controller 107 (such as an infrared or RF remote control, gaming controller, etc.).

The gateway 104, the media processors 106, and media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, and so on).

A satellite broadcast television system can be used in place of the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

A converter 175 can be used for converting or otherwise adjusting between three-dimensional image content and two-dimensional image content. The image content can be in various forms, including still images, moving images and video games. The converter 175 can be a separate device that is configured for wired and/or wireless communication with media presentation devices and/or media processors, including set top boxes, televisions and so forth. The converter 175 can also be incorporated into the media presentation devices and/or media processors, including the set top boxes and televisions. In one embodiment, the converter 175 can receive a broadcast of three-dimensional image content and adjust it into two-dimensional image content without the need to change the channel or to interrupt the broadcast. In another embodiment, the adjustment of the broadcast between the three-dimensional image content and the two-dimensional image content can be performed in real-time by the converter 175. The three-dimensional image content can be based upon various three-dimensional imaging techniques, including polarization, anaglyphics, active shuttering (such as alternate frame sequencing), autostereoscopy, and so forth.

Figure 2:
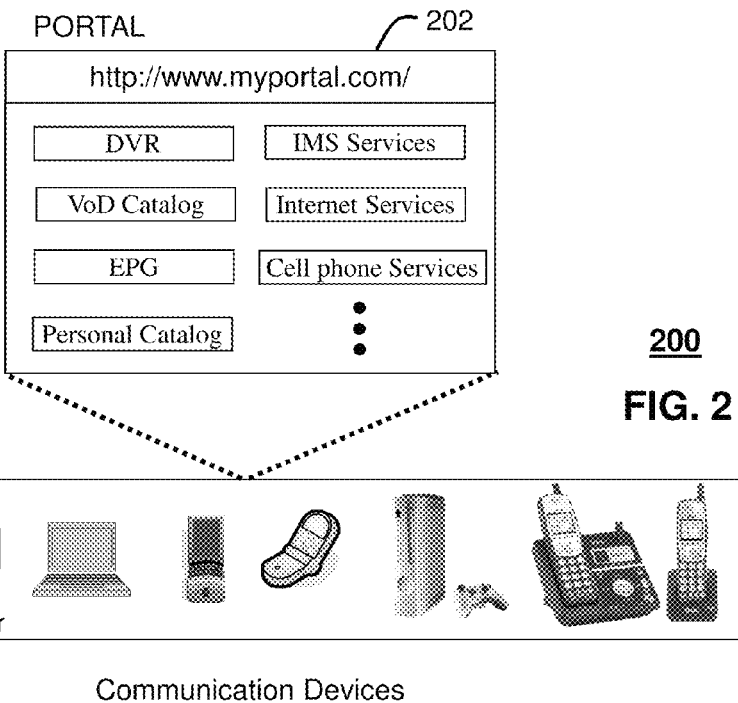
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication system 100. The portal 202 can be accessed by a Uniform Resource Locator (URL) with a common Internet browser using an Internet-capable communication device such as those illustrated FIG. 1. The portal 202 can be configured, for example, to access a media processor 106 and services managed thereby such as a Digital Video Recorder (DVR), a VoD catalog, an EPG, video gaming profile, a personal catalog (such as personal videos, pictures, audio recordings, etc.) stored in the media processor, provisioning IMS services described earlier, provisioning Internet services, provisioning cellular phone services, and so on.

Figure 3:
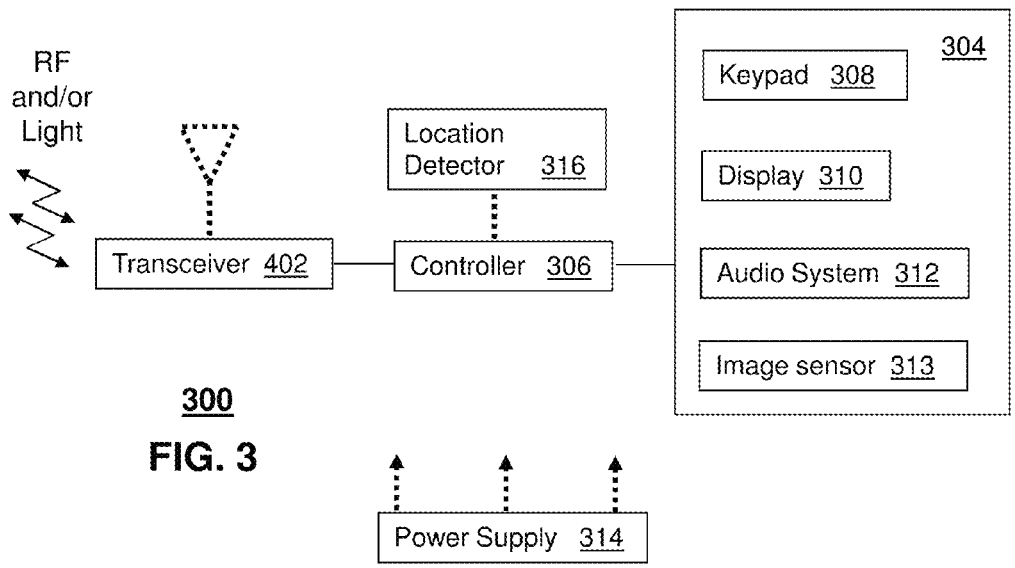
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1 and other communications described herein. The communication device 300 can comprise a wireline and/or wireless transceiver 302 (herein transceiver 302), a user interface (UI) 304, a power supply 314, a location detector 316, and a controller 306 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio for hands free operation. The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location detector 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1, as well as IMS CDs and PSTN CDs. It will be appreciated that the communication device 300 can also represent other common devices that can operate in communication system 100 of FIG. 1 such as a gaming console and a media player.

Figure 4:
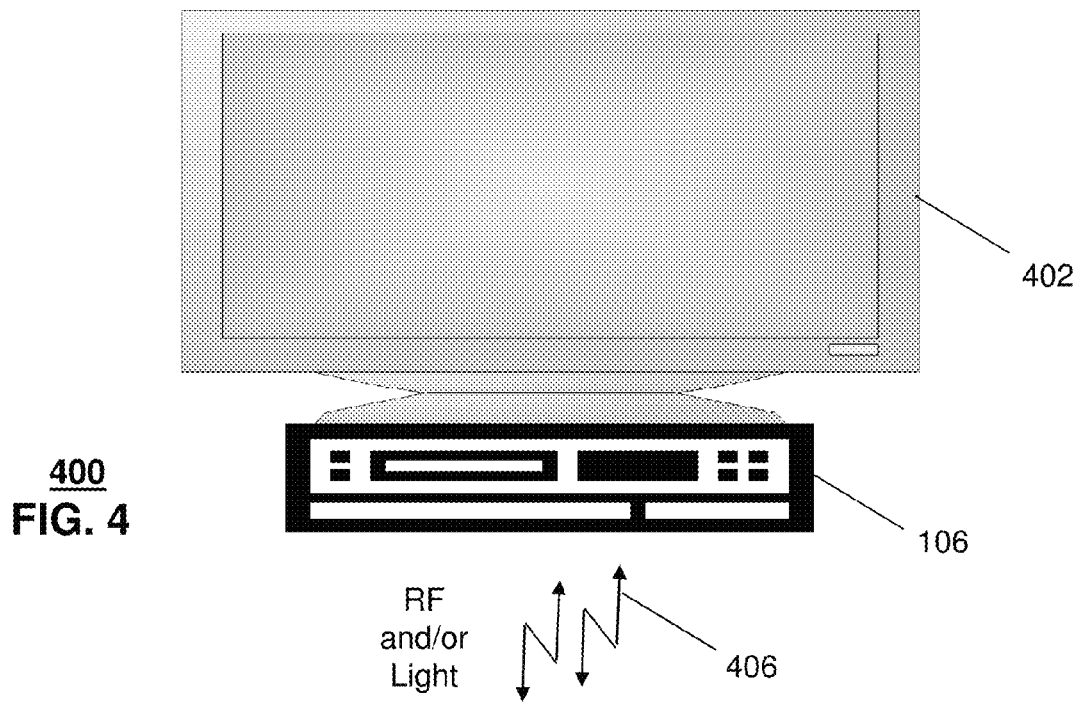
FIG. 4 depicts an illustrative embodiment of a presentation device and media processor for presenting media content.

FIG. 4 depicts an illustrative embodiment of a presentation device 402 and media processor 106 for presenting media content. In the present illustration, the presentation device 402 is depicted as a television set. It will be appreciated that the presentation device 402 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 402 to emit images associated with media content. It is further noted that the media processor 106 and the presentation device 402 can be an integral unit. For example, a computer or cellular phone having computing and display resources collectively can represent the combination of a presentation device 402 and media processor 106.

Figure 5:
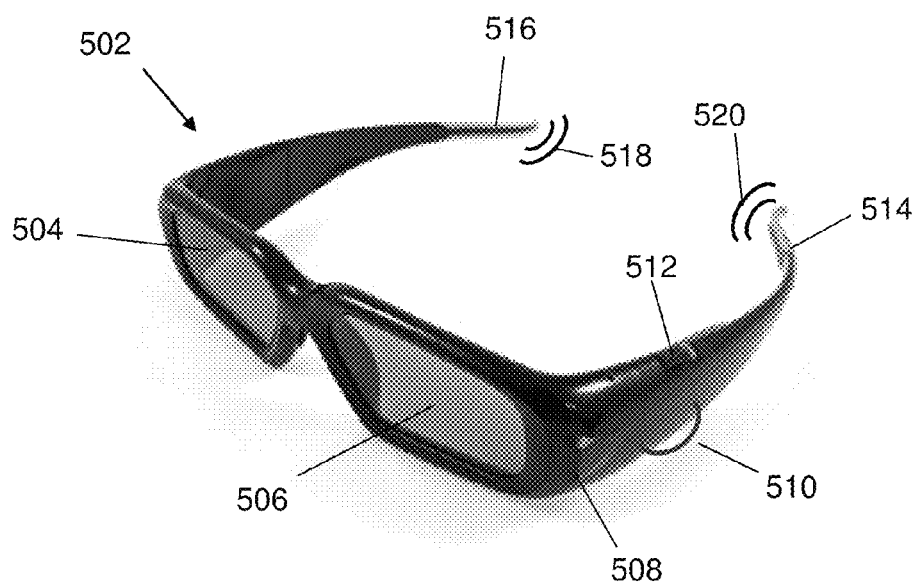
FIG. 5 depicts an illustrative embodiment of a viewing apparatus.

The media processor 106 can be adapted to communicate with accessories such as the viewing apparatus 502 of FIG. 5 by way of a wired or wireless interface. The communication can be one-way and/or two-way communication, such as providing the viewing apparatus 502 with a transceiver. A wired interface can represent a tethered connection from the viewing apparatus to an electro-mechanical port of the media processor (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 502 is contemplated by the presented disclosure.

The viewing apparatus 502 can represent an apparatus for viewing two-dimensional (2D) or three-dimensional (3D) stereoscopic images which can be still or moving images. The viewing apparatus 502 can be an active shutter viewing apparatus. In this embodiment, each lens has a liquid crystal layer which can be darkened or made to be transparent by the application of one or more bias voltages. Each lens 504, 506 can be independently controlled. Accordingly, the darkening of the lenses can alternate, or can be controlled to operate simultaneously.

Each viewing apparatus 502 can include all or portions of the components of the communication device 300 illustrated in FIG. 3. For example, the viewing apparatus 502 can utilize the receiver portion of the transceiver 302 in the form of an infrared receiver depicted by the window 508. Alternatively, the viewing apparatus 502 can function as a two-way communication device, in which case a full infrared transceiver could be utilize to exchange signals between the media processor 106 and the viewing apparatus 502.

The viewing apparatus 502 can utilize a controller 306 to control operations thereof, and a portable power supply (not shown). The viewing apparatus 502 can have portions of the UI 304 of FIG. 3. For example, the viewing apparatus 502 can have a multi-purpose button 512 which can function as a power on/off button and as a channel selection button. A power on/off feature can be implemented by a long-duration depression of button 512 which can toggle from an on state to an off state and vice-versa. Fast depressions of button 512 can be used for channel navigation. Alternatively, two buttons can be added to the viewing apparatus 502 for up/down channel selection, which operate independent of the on/off power button 512. In another embodiment, a thumbwheel can be used for scrolling between channels.

The viewing apparatus 502 can also include an audio system 312 with one or more speakers in the extensions of the housing assembly such as shown by references 516, 520 to produce localized audio 518, 520 near a user's ears. Different portions of the housing assembly can be used to produce mono, stereo, or surround sound effects. Ear cups (not shown) such as those used in headphones can be used by the viewing apparatus 502 (as an accessory or integral component) for a more direct and low-noise audio presentation technique. The volume of sound presented by the speakers 514, 516 can be controlled by a thumbwheel 510 (or up/down buttons—not shown).

It would be evident from the above descriptions that many embodiments of the viewing apparatus 502 are possible, all of which are contemplated by the present disclosure.

Figure 6:
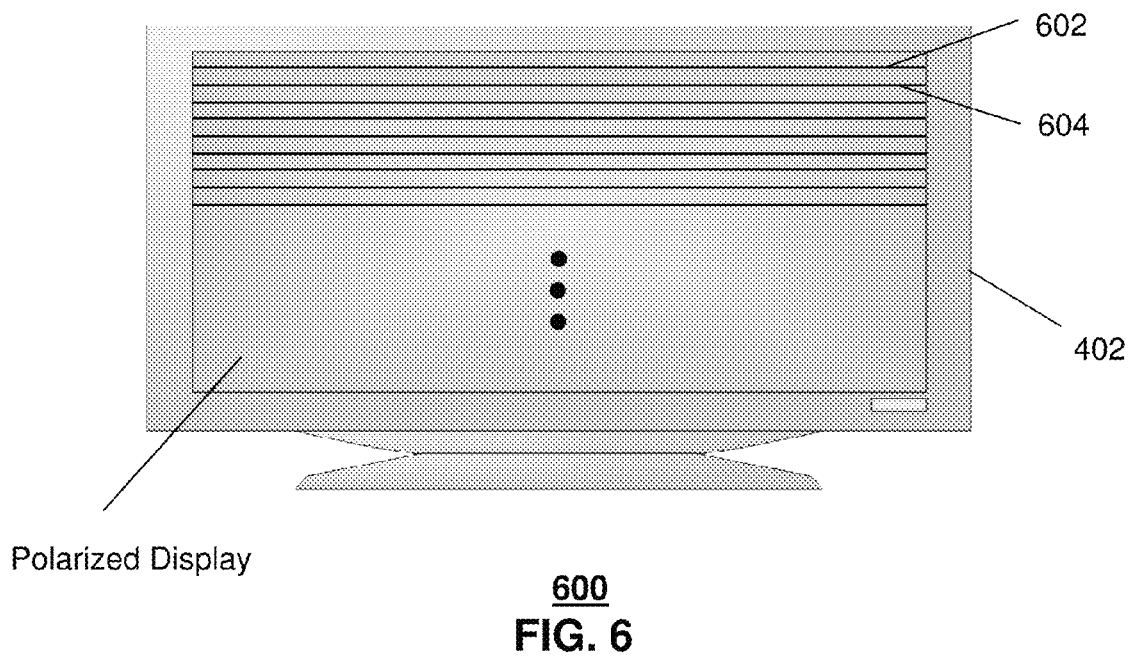
FIG. 6 depicts an illustrative embodiment of a presentation device with a polarized display.

FIG. 6 depicts an illustrative embodiment of the presentation device 402 of FIG. 4 with a polarized display. A display can be polarized with well-known polarization filter technology so that alternative horizontal pixel rows can be made to have differing polarizations. For instance, odd horizontal pixels 602 can be polarized for viewing with one polarization filter, while even horizontal pixels 604 can be polarized for viewing with an alternative polarization filter. The viewing apparatus 502 previously described can be adapted to have one lens polarized for odd pixel rows, while the other lens is polarized for viewing even pixel rows. With polarized lenses, the viewing apparatus 502 can present a user a 3D stereoscopic image.

Figure 7:
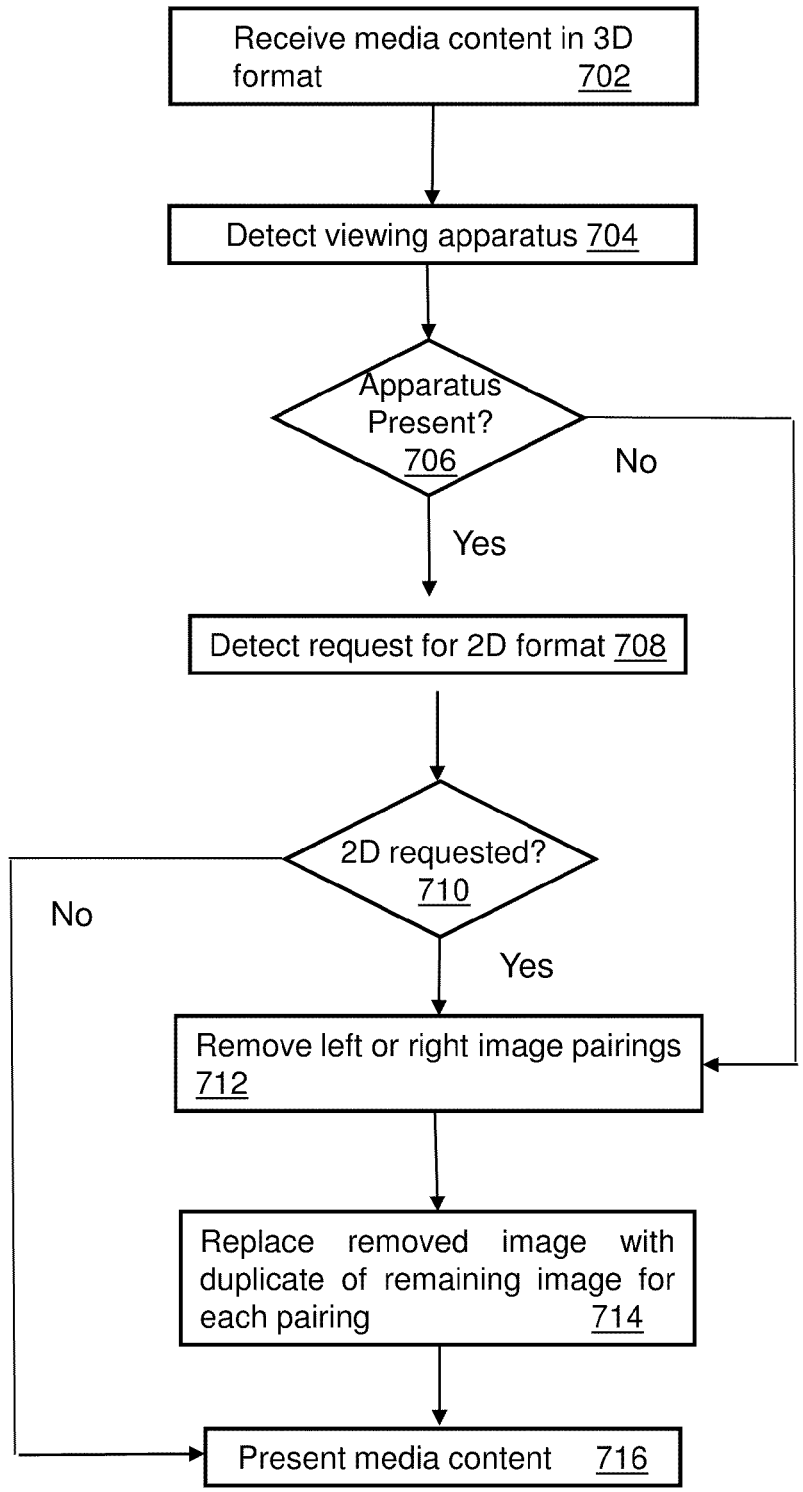
FIG. 7 depicts an illustrative embodiment of a method operating in portions of the devices and systems of FIGS. 1-6.

FIG. 7 depicts an illustrative embodiment of a method 700 operating in portions of the devices and systems described herein and/or illustrated in FIGS. 1-6. Method 700 can begin with step 702 in which media content in 3D format is received by a user's media processor 106, which can include an STB and a television having the media processor incorporated therein. 3D format media content can comprise images having left and right pairings so that a user views the content in three-dimensions. The particular methodology employed to provide or render the three-dimensional image content can vary and can include active shutter (alternate frame sequencing), polarization and other techniques. The 3D media content can be received by the media processor from various sources, such as via a broadcast over an IPTV network and so forth.

In step 704, a viewing apparatus (such as active shutter glasses or passive polarization glasses) can be detected. The detection can be performed by the media processor, although other devices can also be utilized for this purpose as well. The detection can be based upon a number of thresholds, including recognizing that a viewer is wearing the viewing apparatus; detecting that the viewing apparatus is in a line of sight with a display device upon which the media content is or will be displayed; and determining that the viewing apparatus is within a pre-determined distance of the display device. The techniques and components utilized for detecting the viewing apparatus can vary. For example, the media processor can scan for the presence of the viewing apparatus. This can include two-way communication between the media processor and the viewing apparatus. In one embodiment, the viewing apparatus can emit a signal which is detected by the media processor. Presence and/or distance can be determined based on the signal, including utilizing signal strength. Location techniques can also be used for determining a position of the viewing apparatus, including triangulation and so forth.

In another embodiment, image recognition can be utilized to determine if a viewer is wearing the viewing apparatus. For instance, an image of the viewing area can be captured such as through a camera operably coupled to or incorporated in the media processor) and one or more viewers can be detected by applying image recognition techniques to the image. Once the viewers are detected, additional image recognition can be applied to the face of the viewers to determine whether the viewers are wearing the viewing glasses. In yet another embodiment, line of sight determination can be utilized to detect the presence of the viewing apparatus. A signal can be transmitted between the media processor and the viewing apparatus to determine if the two components have an unobscured line of sight. Signal strength and/or signal type, including infrared, can be utilized in order to determine if an unobscured line of sight exists for the viewing apparatus.

If the viewing apparatus and/or a viewing apparatus for each of the viewers is detected in step 706 then method 700 can perform step 708 to detect a request for 2D image content. If on the other hand the viewing apparatus is not detected and/or one or more viewers is determined not to have the viewing apparatus then method 700 can perform step 712 to commence the conversion of the 3D image content to 2D image content.

In step 708, the media processor can determine whether a user has requested the conversion to 2D image content. In one embodiment, the remote controller can have a dedicated button which when pressed provides the media controller with the request for the conversion. In another embodiment, the media controller can present an option for conversion to 2D image content, such as upon detection that a viewing apparatus is not present. For example, the media processor can perform image recognition to determine the number of viewers in the viewing area and then can detect if any of the viewers are not wearing or otherwise do not have a viewing apparatus. The detection of one or more of the viewers being without a viewing apparatus can be performed in a number of different ways, including additional image recognition of the faces of the viewers; presence detection performed by the media processor such as through detecting signals admitted by each of the viewing apparatus; and/or other techniques, including knowledge of the number of viewing apparatuses associated with the media processor (such as a media processor being configured with information that the user has purchased four sets of 3D glasses). In one embodiment, if it is determined that at least one of the viewers does not have the 3D glasses, then the media processor can present an option to convert the media content to 2D image content. The exemplary embodiments contemplate other ways in which the option for conversion is presented, such as upon the broadcast being first received by the media processor. The particular GUI utilized for presenting the option can vary, including a text message displayed across a portion of the display device that asks if the viewer desires to convert the media content. The text message can be configured in a number of different ways, such as type of language, semi-transparent and so forth. In one embodiment. The text message can be based on user preferences, such as from a user profile or user pre-selections.

If a 2D request is not detected in step 710 then method 700 can perform step 716 of presenting the media content in its current format (such as 3D image content). If on the other hand a 2D request is detected then method 700 can perform step 712 to commence the conversion of the 3D image content to 2D image content.

Figure 8:
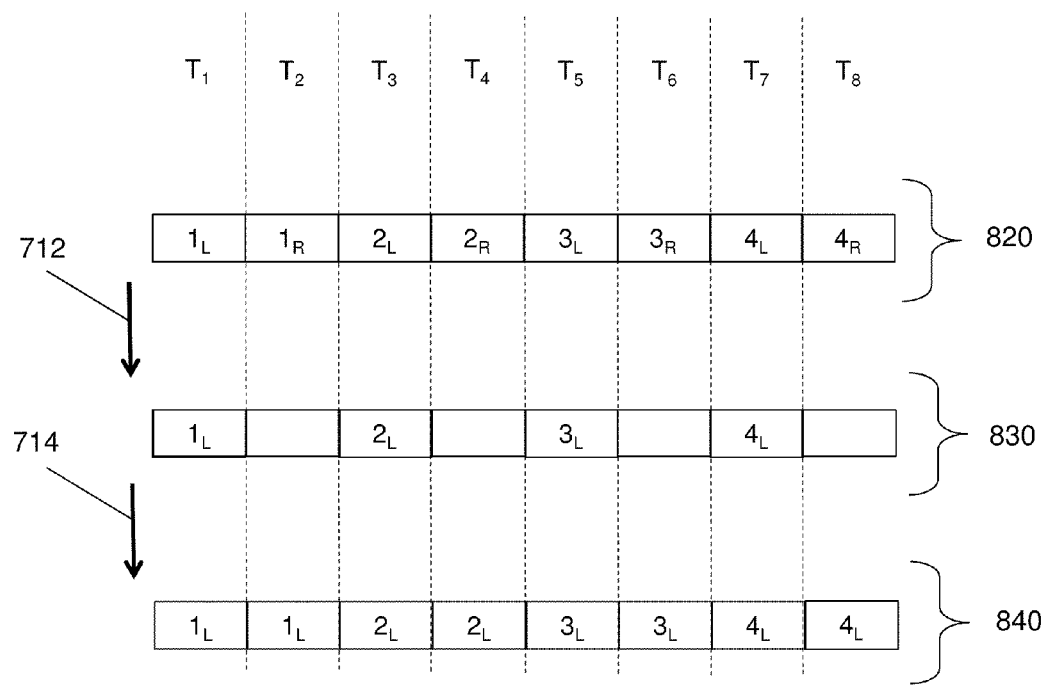
FIG. 8 depicts an illustrative timing diagram for adjusting media content between three-dimensional image content and two-dimensional image content.

In step 712, the media processor can convert the broadcast 3D image content that it has received, by removing either the left image pairings or the right image pairing from the media content. In one embodiment as shown in FIG. 8 in an alternate frame sequencing 3D format 800 which can be viewed using active shutter glasses such as LCD shutter glasses, the broadcast media content can be presentable with alternating frames 820 of left and right pairs for each image in time slots $T_1$ through $T_n$, such as a left and right first image $1_L$ and $1_R$, followed by a left and right second image $2_L$ and $2_R$ and so on, where the left and right pairs are of the same image but from different angles in order to render the image in 3D. Alternate frame sequencing techniques can be utilized where the media content is to be presented in 3D format, such as synchronizing each of the lenses in the active shutter glasses to be opening and closing with the presentation of the left and right image pairs. One of the image pairs is then removed from the media content, which in this example is the right image pairs as shown by frames 830, although the left image pairs could have been removed instead.

In step 714, the blank frame is filled with the image pair which was not removed, which in this example is the left pair, resulting in frames 840 with pairs of the same images being presented in sequence. The media processor can fill the blank frames with a duplicate of the pair which was not removed, although the exemplary embodiment contemplates filling the frame with an image that is less than an exact copy, such as an image that may not include all of the background content. While this example of FIG. 8 is based on alternate frame sequencing 3D, method 800 can also be applied to other 3D formats, including polarization, where one of the left or right image pairs is replaced by the other of the left or right image pairs in the alternating horizontal (or vertical) rows.

In step 716, the media processor can then present the converted media content with the 2D images on a display device.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 700. For example, a cellular phone can be adapted to convert a broadcast of 3D image content to 2D image content.

In one embodiment, 2D and 3D sources can be mapped and indexed to each other so that the source can be selectively changed, such as in response to a viewers request or a detection of a lack of 3D glasses, without interruption of the presentation of the media content. In another embodiment, the media content can be video games that are being transmitted to a gaming console in 3D format, such as from a backend server over the Internet. The gaming console can then selectively convert the 3D images to 2D images for presentation on a display device, such as a television or a monitor.

In one embodiment, the media processor can have the ability to receive the various frames that make up the 3D image content and can have the ability to remove and duplicate selective frames, but can be unable to generate left and right pairs of the images.

Other suitable modifications can be applied to the present disclosure without departing from the scope of the claims below. Accordingly, the reader is directed to the claims section for a fuller understanding of the breadth and scope of the present disclosure.

Figure 9:
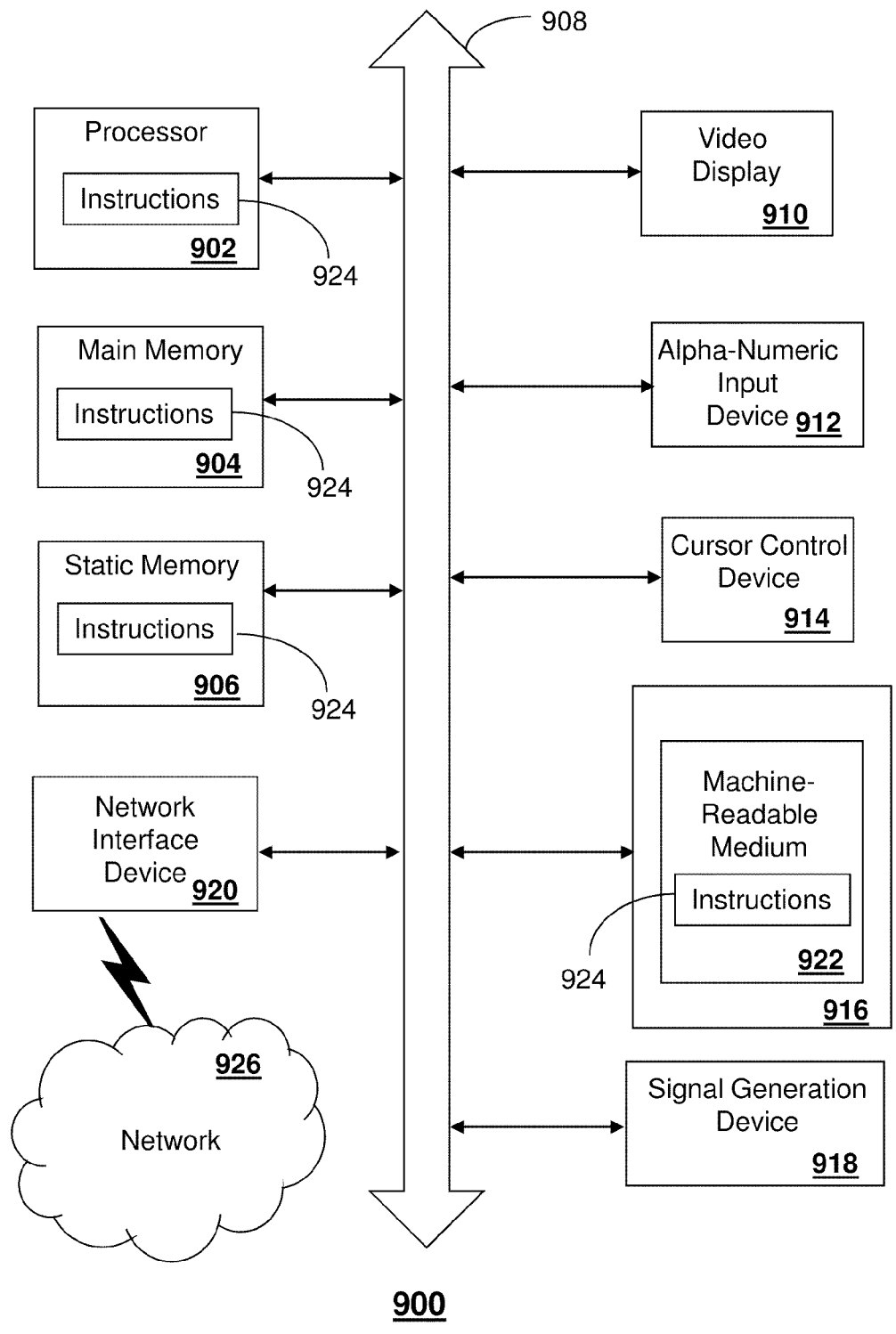
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising
a controller; and
a memory to store executable instructions that, when executed by the controller, facilitate performance of operations comprising:
  receiving a broadcast of media content comprising three-dimensional image content for presentation on a display device operably coupled with the media processor;
  detecting a presence of a viewing apparatus;
  determining that the viewing apparatus is within a line-of-sight of the display device upon which the media content is displayed;
  determining a presence of a viewer without a viewing apparatus, responsive to determining that the viewing apparatus is within the line-of-sight;
  detecting a request for two-dimensional image content responsive to the presence of the viewing apparatus and the presence of the viewer without the viewing apparatus;
  adjusting the broadcast of the media content to comprise two-dimensional image content based on the detecting the request for two-dimensional image content; and
  presenting the media content on the display device, wherein the controller adjusts the media content to comprise the two-dimensional image content during presentation of the broadcast of the media content on the display device, wherein the three-dimensional image content comprises image pairs, each comprising a left image and a right image, and wherein the controller adjusts the media content to comprise the two-dimensional image content by replacing one of the left image or the right image of the image pairs with another one of the left image or the right image of the image pairs.

2. The media processor of claim 1, wherein the detecting the presence of the viewing apparatus comprises detecting a viewing apparatus that is usable to view the three-dimensional image content, and wherein the controller adjusts the media content to comprise the two-dimensional image content when the viewing apparatus is not detected, and wherein the determining of the presence of the viewer without the viewing apparatus comprises determining a number of viewers present within a viewing area of the display device.

3. The media processor of claim 2, wherein the detecting the presence of the viewing apparatus is based on a signal emitted by the viewing apparatus, the operations further comprising determining, based on the signal, that the viewing apparatus is within a predetermined distance of the display device.

4. The media processor of claim 2, wherein the detecting of the number of viewers present comprises applying image recognition to an image of the viewing area, and wherein the determining the presence of the viewing apparatus is responsive to the detecting of the number of viewers, and comprises applying image recognition to a face of a viewer of the display device.

5. The media processor of claim 2, wherein the operations further comprise engaging in two-way communication with the viewing apparatus to:
  detect the presence of the viewing apparatus; and
  synchronize the viewing apparatus with a sequential presentation of left and right image pairs of the three-dimensional image content.

6. The media processor of claim 1, wherein the display device is incorporated with the media processor in a television, the operations further comprising determining that the line-of-sight is unobstructed, wherein the detecting of the presence of the viewing apparatus is based on the determining that the line-of-sight is unobstructed.

7. The media processor of claim 6, wherein the operations further comprise receiving a signal from a remote control, wherein the controller adjusts the media content to comprise the two-dimensional image content in response to receiving the signal, and wherein the determining that the line-of-sight is unobstructed is based on one of a signal strength, a signal type, or both.

8. The media processor of claim 1, wherein the three-dimensional image content comprises image pairs comprising left images and right images that are oppositely polarized, and wherein the operations comprise adjusting the media content to comprise the two-dimensional image content by replacing one of the left images or the right images of the image pairs with another one of the left images or the right images of the image pairs.

9. A non-transitory machine-readable storage medium operating in one of a gaming console, a set top box or a television, comprising executable instructions that, when executed, facilitate performance of operations comprising:
  receiving a broadcast of media content comprising three-dimensional image content for presentation on a display device operably coupled with one of the gaming console, the set top box or the television;
  detecting a presence of a viewing apparatus;
  determining that the viewing apparatus is within a line-of-sight of the display device upon which the media content is displayed;
  determining a presence of a viewer without a viewing apparatus, responsive to determining that the viewing apparatus is within the line-of-sight;
  detecting a request for two-dimensional image content responsive to the detecting the presence of the viewing apparatus and the presence of the viewer without the viewing apparatus; and
  adjusting the broadcast of the media content based on the detecting the request for two-dimensional image content to comprise two-dimensional image content during presentation of the broadcast of the media content on the display device, wherein the three-dimensional image content comprises image pairs comprising left images and right images, and comprising computer instructions to adjust the media content to comprise the two-dimensional image content by replacing one of the left images or the right images of the image pairs with another of the left images or the right images of the image pairs.

10. The non-transitory machine-readable storage medium of claim 9, wherein the media content comprises video game images.

11. The non-transitory machine-readable storage medium of claim 9, wherein the three-dimensional image content is polarized, the operations further comprising determining, based on a signal emitted by the viewing apparatus, that the viewing apparatus is within a predetermined distance of the display device.

12. The non-transitory machine-readable storage medium of claim 9, wherein the operations further comprise:
   detecting a viewing apparatus that is usable to view the three-dimensional image content; and
   adjusting the media content to comprise the two-dimensional image content when the viewing apparatus is not detected.

13. The non-transitory machine-readable storage medium of claim 9, wherein the operations further comprise:
   presenting an option to view the media content as one of two-dimensional images or three-dimensional images; and
   adjusting the media content to comprise the two-dimensional image content based on a selection of the option.

14. The non-transitory machine-readable storage medium of claim 13, wherein the operations further comprise:
   detecting a viewing apparatus that is usable to view the three-dimensional image content; and
   presenting the option to view the media content as one of the two-dimensional images or the three-dimensional images when the viewing apparatus is not detected.

15. A method comprising:
   receiving, by a media processor, media content comprising three-dimensional image content for presentation on a display device operably coupled to the media processor;
   detecting, by the media processor, a presence of a viewing apparatus;
   determining, by the media processor, that the viewing apparatus is within a line-of-sight of the display device upon which the media content is displayed;
   determining, by the media processor, a presence of a viewer without a viewing apparatus, responsive to determining that the viewing apparatus is within the line-of-sight;
   detecting, by the media processor, a request for two-dimensional image content responsive to the presence of the viewer without the viewing apparatus;
   adjusting, by the media processor, in real time, the media content based on the detecting the request for two-dimensional image content to comprise two-dimensional image content; and
   presenting the media content on the display device.

16. The method of claim 15, wherein the three-dimensional image content comprises image pairs comprising left images and right images, and wherein the adjusting of the media content comprises replacing one of the left images or the right images of the image pairs with another one of the left images or the right images of the image pairs.

17. The method of claim 15, wherein the three-dimensional image content utilizes alternate frame sequencing.

18. The method of claim 15, wherein the detecting the presence of the viewing apparatus comprises detecting that the viewing apparatus that is usable to view the three-dimensional image content.

19. The method of claim 15, comprising performing one of:
   presenting, by the media processor, an option for viewing the media content as one of two-dimensional images or three-dimensional images,
   adjusting, by the media processor, a broadcast of the media content to comprise the two-dimensional image content when a viewing apparatus usable to view the three-dimensional image content is not detected, or a combination thereof.

20. The method of claim 15, wherein the media content comprises video game images.

* * * * *